Nov. 3, 1959 J. P. HOPKINS 2,910,789
APPARATUS FOR LOADING MOTORIZED EARTH SCRAPERS
Filed Nov. 25, 1957 2 Sheets-Sheet 1

INVENTOR.
JOHN P. HOPKINS
BY
Reynolds, Beach & Christensen
ATTORNEYS

Nov. 3, 1959     J. P. HOPKINS     2,910,789
APPARATUS FOR LOADING MOTORIZED EARTH SCRAPERS
Filed Nov. 25, 1957     2 Sheets-Sheet 2
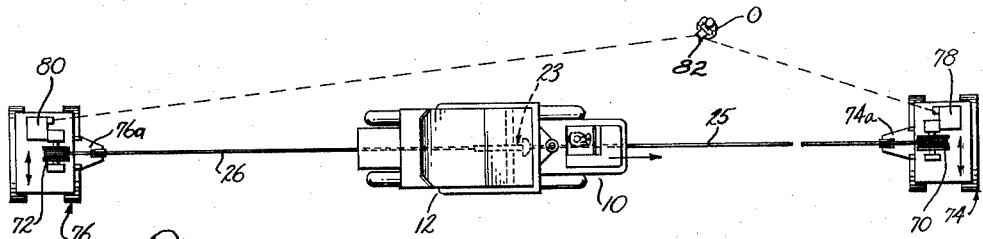
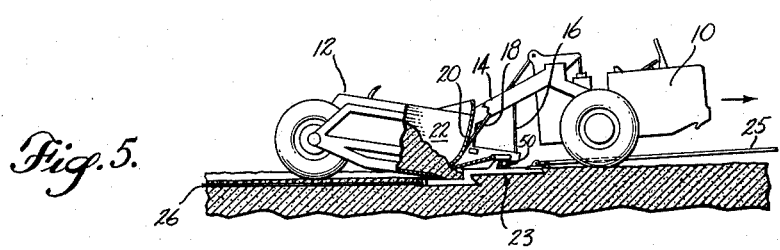
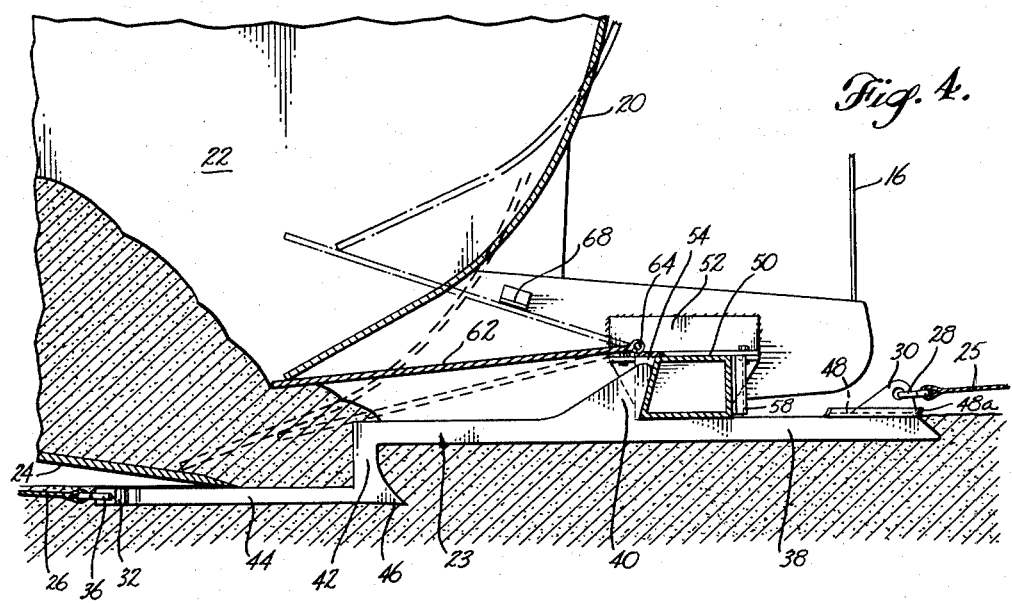
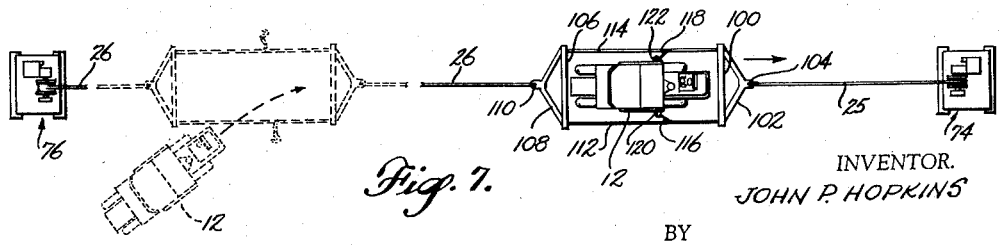
INVENTOR.
JOHN P. HOPKINS
BY
Reynolds, Beach & Christensen
ATTORNEYS

United States Patent Office 2,910,789
Patented Nov. 3, 1959

2,910,789

APPARATUS FOR LOADING MOTORIZED EARTH SCRAPERS

John P. Hopkins, Mercer Island, Wash.

Application November 25, 1957, Serial No. 698,805

19 Claims. (Cl. 37—115)

This invention relates to improvements in and a novel system for operating earth moving equipment, particularly motor scrapers. The invention is herein illustratively described by reference to the presently preferred forms thereof; however, it will be recognized that certain modifications and changes therein with respect to details may be made without departing from the essential features involved.

In many applications, motor scrapers of practical design have insufficient traction and power to take on load, but once loaded are in practically all situations capable of transporting the load efficiently to a dumping point. In those cases, it has been necessary to connect one or more additional tractors to a scraper for augmenting drive power during loading operations. This procedure takes time, presents problems of mechanical coordination between interconnected units, requires additional operating personnel and ties up much heavy and expensive equipment of a type which is by nature relatively costly to maintain and service. Nor is it economically practicable to provide heavy endless tread tractors in the motorized scraper units themselves, inasmuch as such tractors are not only inherently slow moving and less maneuverable than is desirable for transport of loads, but they are expensive and costly to maintain and service.

It is an object of this invention to overcome these difficulties in a practical, efficient and economical manner. More specifically, it is an object herein to provide auxiliary tow apparatus and a system for operating earth moving motor scrapers which will require only a minimum of additional equipment and which will enable the motorized power unit of the scraper to be of optimum economical and mobile design for transport purposes.

A related object is to enable motor scrapers to be staged for loading, loaded, and released for transport operation in rapid succession, so that a single auxiliary tow rig may be used efficiently with a gang of scrapers.

A specific object is to provide versatile towing apparatus achieving the foregoing objectives and which may be set up for operation and moved about quickly and easily as necessary with progress on a job, and which lends itself to coordinated control by a single operator stationed at any convenient observation point.

A further object is to achieve a relatively simple, reliable, safe, inexpensive, easily maintained and highly effective towing apparatus of the described type, the operation of which in conjunction with motor scrapers requires only minimal and simple additions to or modifications of conventional scrapers.

A still more specific object in terms of the preferred embodiment of the invention is a novel tow rig for scrapers and the like using cables for towing and haulback purposes, and a detachable tow connector unit connected between such cables, the arrangement being such that the cables are relatively invulnerable to damage by or during loading and transport movements of the scrapers in the work arena.

Further, it is desirable that the motor scrapers be easily and quickly engaged by the connector unit and as easily disengaged therefrom without the attention of a separate person and without requiring the scraper driver to leave his seat. Furthermore, it is desirable in accordance with the preferred embodiment of this invention to enable the operator of the motor scraper to engage and disengage from the connector unit without use of special apparatus or controls.

Further objectives of the invention relate to improvements in the loading ability of scrapers in loose sand and gravel, materials which, because of their relative fluidity, tend to pile up ahead of the conventional scraper blade instead of entering the bowl. It is an object herein to provide a very simple, effective and reliable improvement in scrapers achieving these results and adapted to be installed in conjunction with elements implementing the scraper for operation in conjunction with the novel tow apparatus.

As herein disclosed the invention is shown applied to a motor scraper of the conventional type wherein the bowl structure is a rear-wheeled cart type and the motor unit comprises a two-wheeled tractor connected to the bowl structure by means permitting the forward end of the latter to be lowered for loading and raised for transporting the load. A forward gate cooperating with the scraper blade serves as a bowl closure which is raised in relation to the blade for and during the loading operation. It will be understood, however, that the invention in at least certain of its aspects is also applicable to other types of power scrapers.

Certain features of the invention reside in the novel tow connector and related coupling means on the scraper, wherein the tow connector is secured to a winched tow cable for augmenting or replacing scraper power during loading; in the provision of a tow connector of a form adapted to remain connected to a haulback cable during towing without damaging the haulback cable nor encountering interference with the scraper; in the over-all method and apparatus for operating power scrapers for loading, utilizing a winched tow connector and related haulback means; and in the scraper improvements including the coupling means and a support therefor, cooperable with the tow connector, and the loading plate means preferably mounted on the coupling means support and operable, in cooperation with the gate, to facilitate loading of the scraper in fluidic earth materials.

These and other features, objects and advantages of the invention will become more fully evident from the following description by reference to the accompanying drawings.

Figure 4 is a sectional side view showing a scraper bowl taking on load, and employing features of this invention.

Figure 5 is a side view with parts broken away illustrating the loading operation of a motor scraper according to the present invention.

Figure 6 is a plan view of a complete loading system employing the invention.

Figure 7 is a plan view illustrating a loading system for scrapers, wherein a modified tow connector and coupling means for the scraper are employed.

Figure 1:
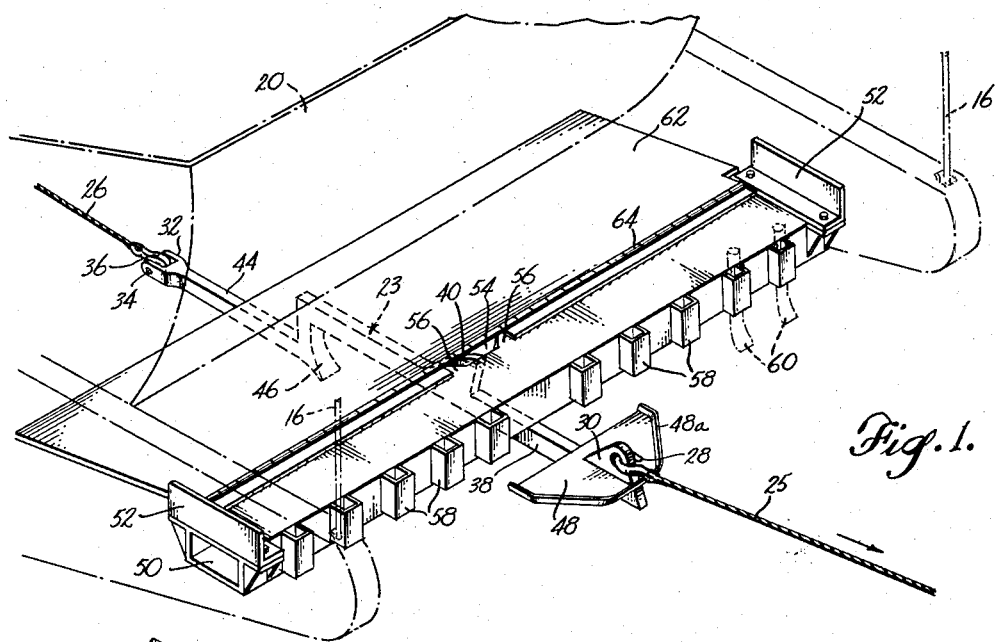
Figure 1 is a perspective view of the tow connector and associated coupling means and loading plate structure adapted to be mounted on a conventional scraper, the forward end portion of the bowl structure of such a scraper being shown by broken lines to illustrate the mounting location of the scraper coupling means.
Figure 2:
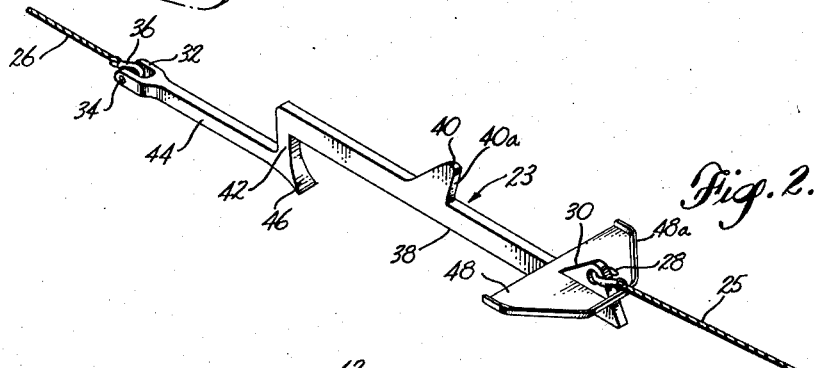
Figure 2 is a perspective view of the novel tow connector as connected between tow and haulback cables.
Figure 3:
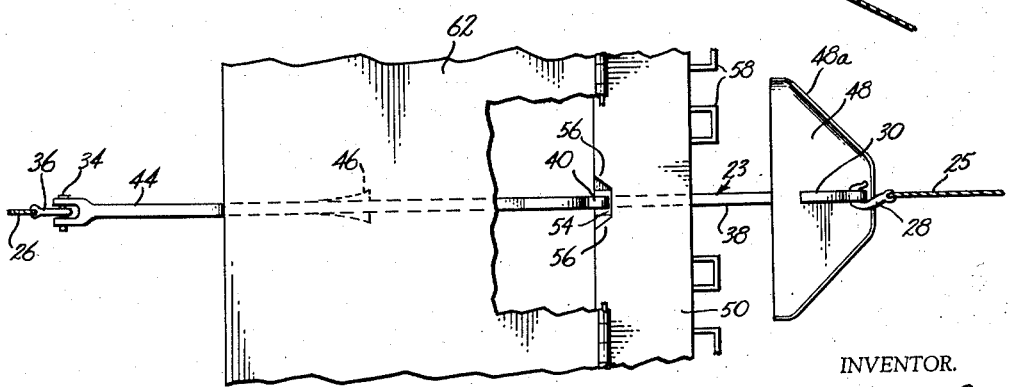
Figure 3 is a top, partially fragmentary view of the elements shown in Figure 1.

Referring to the drawings, the illustrated conventional motor scraper comprises a power traction unit 10 and a bowl structure or cart 12. Both units are two-wheeled and are interconnected by a beam structure 14 suitably constructed and arranged to permit raising and lowering the forward end of the bowl structure 12 by means of a set of hoist cables 16. Separate cables 18 are provided for raising and lowering the transversely disposed door 20 which serves as a closure for the front end of bowl 22. The bottom of the bowl 22 includes or carries a forwardly projecting scraper blade 24. For loading purposes the forward end of the bowl structure 12 is lowered and the downwardly and rearwardly curved gate 20 is raised in relation to the scraper blade 24, whereupon forward movement of the motor scraper causes dirt to be scooped into the bowl. With the bowl loaded the hoist cables 16 are taken in, raising the forward end of the bowl for transport purposes.

As previously mentioned, such motor scrapers are useful primarily because of their maneuverability and capacity to transport quickly acquired loads over substantial distances for discharge and return quickly to the loading point for repeating the operation. However, those features of such motor scrapers which give them mobility and efficiency for that type of operation make them inadequate in terms of power, weight and traction for taking on load in hard or extremely heavy earth formations. It has therefore become the practice in the past to make available one or more heavy endless tread tractors which can be connected in tandem with each motor scraper during loading in order to develop the necessary pull on the scraper bowl structure. Such a practice ties up very expensive equipment which is costly to maintain and service. Moreover, the coupling and decoupling of these power units from the motor scraper takes time and retards the overall operation.

By this invention a tow connector 23 is secured by its forward end to a tow cable 25 and, in the preferred embodiment, by its rearward end to a haulback cable 26. For convenience the tow cable may be provided with a hook 28 engageable in an eye formed in a lug 30 on the forward end of the connector. A yoke 32 on the rearward end of the connector carries a coupling pin 34 for securement of a haulback connector eye 36 to the tow connector.

Preferably the tow connector 23 comprises an elongated draw bar structure comprising a forward end portion 38 of elongated form with an upwardly projecting lug 40 stationed rearwardly from its forward end and serving as a coupling element for engaging a complementally formed coupling element on the motor scraper, to be described. As shown, the upstanding lug 40 has a forwardly and upwardly inclined forward edge portion 40a which is adapted to lodge against and be retained by a tow coupling element on the scraper. Generally intermediate its ends the tow connector bar has a vertical offset 42 interconnecting the portion 38 and the relatively lower rearward bar portion 44. The offset 42 preferably carries or comprises a forwardly and downwardly projecting plow or furrowing element 46 for entrenching the haulback cable.

A stabilizing surface plate 48 is mounted horizontally on the top of the forward bar portion 38 to project laterally from opposite sides thereof. This plate has a reinforcing flange 48a extending around its forward and side edges to impart stiffness to it. This plate serves the multiple function of preventing excessive penetration of the forward end of the tow connector into the ground and of preventing the connector from tipping sideways so that the coupling element or lug 40 will be less readily engaged by the scraper coupling element during the hitching of a motor scraper to the tow connector.

Extending between opposite sides of the scraper bowl structure forwardly of the gate 20 is a transverse beam or bar 50 carried by supporting brackets 52 which are welded or otherwise fastened to the side members of the bowl structure as shown. Midway between opposite ends of the cross beam 50 there is provided a socket or notch 54 on the side of the beam facing to the rear, which is engageable by the coupling lug 40 on the tow connector. This socket, serving as the scraper coupling element, is formed by ribs 56 projecting from the rear face of the beam 50 at locations spaced apart sufficiently to accommodate readily the lug 40. Such ribs have sufficient projecting width to prevent sliding of the lug 40 out of central position along the beam 50 should the scraper heading differ from the direction of extent of the tow cable at any time. The cross beam 50 is made sufficiently stiff, of course, to prevent appreciatble forward bending thereof under load during towing of the scraper by means of the tow cable 25. Being mounted on the opposite side portions of the forward end of the scraper bowl structure, the beam is raised and lowered with the forward end of the scraper. When raised, the beam passes over the upwardly projecting lug 40, as during forward movement of the scraper into towing position in relation to the tow connector 23, and when lowered, the beam is adapted to rest on the forward bar portion 38 of the tow connector so that upon forward movement of the tow connector, drawn by the tow cable, the lug will move into engagement with the coupling notch 54 on the rear side of the beam 50. Disengagement between these coupling elements is as easily effected, being accomplished simply by driving forward and raising the forward end of the bowl structure, whereupon the loaded scraper may be driven away for discharging its load.

It will be evident that the forward and upward incline of the forward edge of the tow connector lug 40, which is matched by the downward and rearward incline of the rear face of the beam 50 between the ribs 56, tends to prevent disengagement between these coupling elements during the towing operation.

At interval locations along the length of the beam 50 scarifier teeth sockets 58 are mounted on the forward face of such beam and are adapted to hold scarifier teeth 60 shown by dotted lines in Figure 1. These teeth may be employed when necessary in order to loosen the earth ahead of the scraper blade for facilitating loading of the scraper.

Another feature of the scraper structure resides in the loading plate 62 which is hinged by its forward end at 64 on the cross beam 50. The plate preferably extends parallel to the scraper blade substantially for the full distance between opposite sides of the bowl structure and projects to the rear in trailing position from its pivotal connection on the cross beam 50, into contact with the lower portion of the movable scraper gate 20, as shown best in Figure 4. The loading plate is so mounted on the beam 50 that raising of the bowl structure after loading permits the plate to hang down at a very steep angle so that the bowl may be unloaded by the usual method without interference from the plate. However, the plate's lower edge clears the ground with the bowl structure raised. An upper stop 68 limits upward swinging of the plate 62 independent of upward movement of the gate 20 into its fully open position, at or above the broken line position of the gate shown in Figure 4. During loading of the scraper upward movement of the loading plate 62 is limited by its contact with the lower face or edge portion of the gate 20.

The hinged loading plate 62 serves as a pressure plate or deflector preventing fluidic earth materials, such as loose sand or gravel, from merely piling up ahead of the scraper blade instead of entering the bowl 22. It is found that the presence of this plate, mounted on the tow beam 50, greatly facilitates loading of the scraper bowl and, in cooperation with the gate 20, automatically adapts itself to the various loading conditions encountered so as to perform efficiently in all cases.

As shown in Figure 4, contact between the scraper blade 24 and the rearward end portion 44 of the tow connector 23 establishes the lowermost position of the scraper blade during loading. The tow connector 23 engaged with the beam 54 as shown in Figure 4 and drawn by tension in the tow cable 25 thereby serves as a stop or depth gauge for the scraper blade.

In a practical installation utilizing the present invention the tow cable 25 is preferably mounted on a power winch 70 and the haulback cable 26 on a power winch 72. If desired these winches are carried by vehicles such as small caterpillar tractors 74 and 76, respectively, which can be maneuvered to any desired positions in order to change the work arena in which the power scrapers are operating. For efficient operation it is desirable that the power winches 70 and 72 be coordinated and that they be controlled by a single operator O who is stationed at a convenient point of observation. For this reason it is desirable that each power winch and carrier vehicle be remotely controlled. A radio remote control unit 78 on the vehicle 74 is adapted for operating both the power winch 70 and the vehicle itself. A radio remote control unit 80 mounted on the vehicle 76 is likewise adapted for operating both the power winch 72 and the vehicle itself.

The operator O then carries a portable transmitter 82 having the necessary number of channels and controls for causing the power winches and carrier vehicles to operate in the desired manner. The technique by which vehicles and operating apparatus may be controlled remotely through radio transmission is generally well known. Any of these techniques or other suitable methods of control may be utilized in this instance. The important thing is to coordinate operation of the power means for the tow cable and the haulback means and to permit the operator to accurately observe proceedings so as to control these operations efficiently in cooperation with the motor scraper operators.

In accordance with the present method the operator pays out tow cable from the winch 70 while winding in the haulback cable 26 on the winch 72, until the tow connector 23 is returned to a suitable starting position in the work arena. An empty motor scraper 10, 12 returning from the discharge point where the earth is being deposited, is maneuvered, with its scraper bowl raised, into position directly over and in alignment with the two cables, with the tow beam 50 situated just ahead of the tow connector lug 40. The operator is readily able to observe the positioning of the beam 50 by simply glancing back and down over his shoulder and noting when the socket 54 on the after side of the beam 50 is situated directly ahead of the tow connector lug 40 as desired. Thereupon the motor scraper operator signals to the control operator O and the latter, by means of suitable controls, operates the power winch 70 while releasing the haulback winch 72, so as to wind in tow cable 25. In the meantime, the scraper operator has lowered the scraper bowl forward end portion in order to rest the beam 50 on the forward bar portion 38 of the tow connector. Advance of the tow connector 23 brings the lug 40 into engagement in the socket 54, whereupon the motor scraper is now connected to the winch 70 and is drawn forwardly for taking on load independently of power or traction deficiencies of the scraper motor unit 10. When the scraper operator observes that the bowl of the scraper is filled he raises the scraper bowl and thereby clears the blade above ground as well as lifting the bar 50 out of engagement with the tow lug 40. Before so doing, it is preferred that the control operator O be signalled to stop the forward movement of the tow connector 23. In the normal carrying position of the scraper bowl the raised blade clears the ground-hugging tow cable 25 and permits the scraper operator to drive over the tow cable and off to an unloading point. The entire sequence may be performed without the scraper operator being required to leave his seat or to operate any special controls other than those which he normally operates in the motor scraper as such.

When the control operator O observes the loaded scraper departing with its load he simply operates the winches 72 and 70 in reverse and returns the tow connector 23 to a suitable starting point, or leaves it where it is if the loading stroke remains incomplete, preparatory to towing engagement with an empty scraper coming up from the discharge point in order to take on another load. In this manner it is possible with a single set of controls, a single operator, and relatively simple and inexpensive tow apparatus to operate a gang of power scrapers in an efficient and practical manner in all types of terrain and under adverse loading conditions.

The power winch carrier vehicles preferably include guide sheaves on supports 74a and 76a for the respective winches, which supports may be raised or lowered in relation to the ground. It is desirable that the tow cable and haulback cable be placed as near to the ground as possible during operation of the system so that power scrapers and any other vehicles which are operating in the area may simply run over these cables when and as necessary, without encountering interference therefrom and without damaging the cables. Thus, the guide sheave support 74a may be raised and lowered in order to cause the tow cable 25 to depart from the vehicle 74 as low to the ground as necessary whereas the guide sheave support 76a may be operated in a similar manner and for the same purpose in relation to the haulback cable 26. The details of the guide arms 74a and 76a and the mechanism for raising and lowering these arms and thereby the sheaves carried by them are not described nor shown in detail but may be of any suitable and readily devised form.

The furrowing produced by the plow element 46 during the towing movement of the tow connector tends to entrench the haulback cable 26 so as to minimize any possibility of interference therewith or therefrom by the staging of motor scrapers coming into position for loading. However, it is desirable, where a haulback cable is used as the means for returning the tow connector 23 to a starting position, that the fastening point between the haulback cable and the tow connector be situated behind the scraper blade 24 so that it will not be damaged by the blade during operation of the system.

In the modified arrangement shown in Figure 7, essentially the same cable and winch apparatus may be used as in the preceding embodiment, but in this case a modified tow connector is employed. This modified tow connector comprises a harness arrangement comprising a forwardly situated cross beam 100 preferably secured by a yoke 102 and coupling 104 to the tow cable 25, and a similar rearwardly situated cross beam 106, connecting yoke 108 and coupler 110 secured to the haulback cable 26. The length of these beams exceeds the width of the power scrapers with which the tow connector is to be used. Links, which may be of rigid form or flexible, designated 112 and 114, interconnect the ends of the cross beams 100 and 106 to form a cage or harness exceeding the length of a motor scraper in order to accommodate the scraper in the harness. The harness is adapted to rest on the ground and to slide over the ground's surface during free movement thereof. Detachable coupling elements, such as chains with snap connectors, hooks or the like, designated 116 and 118, are fastened to the links 112 and 114 at suitable intermediate locations adapting them to be secured to suitable anchor elements 120 and 122 mounted on the scraper sides near the forward end of the bowl structure. While connectors, substituting for the connectors 120 and 122, may be employed engageable with complemental connectors, substituting for the connectors 116 and 118, and which are adapted to be positioned relatively for interengagement simply by lowering of the forward end portion of the bowl structure 12 into loading position as in the preceding embodiment, it is preferred in this embodiment that the connections be established by manual operation. As in the preceding embodiment, the haulback cable 26, extending from the rear of the harness, is also protected against damage from the scraper blade during loading operation, and also, as in the preceding embodiment, the connector rig is placed low to the ground where it will not interfere with ground movements of scrapers or other vehicles operating in the area.

I claim as my invention:

1. Earth moving apparatus comprising, in combination with a separately powered motor scraper of the type having an earth carrier bowl and a scraper blade for loading of the same, said scraper having tow-coupling means thereon, a tow rig, including a tow cable, adapted for connection to said scraper to tow the scraper for loading, an independently operated power winch for winding in and paying out said tow cable, a ground-engaging tow connector secured to said tow cable and having a coupling element releasably engageable by said scraper coupling means to tow the scraper toward said winch by winding in of said tow cable, thereby to permit loading operation of the scraper with the aid of power from said winch, and separate power-operated haulback means connected to said tow connector and operable to move said ground-engaging tow connector in a selected direction away from said power winch to draw out tow cable from said winch and reposition the tow connector for reengagement by the scraper coupling means, preparatory to a subsequent scraper towing and loading operation.

2. Earth moving apparatus comprising, in combination with a separately powered motor scraper of the type having an earth carrier bowl and a scraper blade for loading of said bowl, said scraper having tow coupling means thereon, a tow rig, including a tow cable, adapted for connection to said scraper to tow the scraper for loading, an independently operated power winch for winding in and paying out said tow cable, a ground-engaging tow connector secured to said tow cable and having a coupling element releasably engageable by said scraper coupling means to tow said scraper toward said winch by winding in of said tow cable, thereby to permit loading operation of said scraper with the aid of power from said winch, said coupling element and coupling means being formed for towing interengagement by positioning of said scraper with its coupling means ahead of and in the path of said coupling element to be contacted thereby during towing movement of the latter, and for disengagement therefrom by independently driving said scraper forwardly in relation to said tow connector, and separate power-operated haulback means connected to said tow connector and operable to move said ground-engaging tow connector in a selected direction away from said winch to draw out tow cable from the winch and reposition the tow connector for reengagement by the scraper coupling means, preparatory to a subsequent scraper towing and loading operation.

3. The earth moving apparatus defined in claim 2, wherein the haulback means comprises a haulback cable connected to the tow connector, and winch means adapted for location remotely from the first-mentioned winch means, and operable to haul in and pay out haulback cable cooperatively with the tow cable winch means.

4. The earth moving apparatus defined in claim 2, wherein the scraper comprises a bowl structure and a motor unit towingly connected to said bowl structure, and wherein the coupling means comprises a structurally mounted member mounted at the forward end portion of the scraper bowl structure and supported by said bowl structure to be raised and lowered, said structurally connected member having a normal position close to the ground and having socket means on the rearward side thereof, and the connector unit coupling element comprises an upstanding lug, said socket means being engageable by said lug by relative approach movement of the lug into said socket means from the rear side of said structurally connected member, effected by forward towing movement of said tow connector, with the structural member in its normal position lowered by the bowl structure to locate said socket means in the path of said tow connector lug.

5. The earth moving apparatus defined in claim 4, wherein the structurally connected member comprises a transverse bar-like member extending between opposite sides of the bowl structure, wherein the bowl structure includes a bottom having a forwardly projecting scraper blade portion, and further includes a gate extending across the forward portion of said bowl structure and adapted to be moved downwardly into closed position with its lower edge positioned next to said blade portion for closing the bowl when loaded, and a loading plate member extending transversely across said bowl structure and having a forward edge pivotally connected to said bar-like member to trail rearwardly therefrom, said plate projecting rearwardly from said bar-like member into adjacency with said gate near the lower edge of the latter and being held against swinging upwardly except with and during opening of said gate, whereby said loading plate holds down and directs into the bowl fluidic earth materials which otherwise tend to pile up ahead of the scraper blade during loading movement of the scraper.

6. The earth moving apparatus defined in claim 4, wherein the structurally connected member comprises a transverse bar-like member extending between opposite sides of the bowl structure, wherein the bowl structure includes a bottom having a forwardly projecting scraper blade portion, and further includes a gate extending across the forward portion of said bowl structure and adapted to be moved downwardly into closed position with its lower edge positioned next to said blade portion for closing the bowl when loaded, and a loading plate member mounted on said bowl structure extending transversely across said bowl structure with its rearward portion adjacent the lower edge of said gate, said plate projecting forwardly from said gate and holding down and directing into the bowl fluidic earth materials which otherwise tend to pile up ahead of the scraper blade during loading movement of the scraper.

7. Earth loading scraper apparatus comprising a bowl structure having ground-engaging wheels and a bowl bottom which includes a forwardly projecting scraper blade portion, and further having a gate extending across the forward portion of said bowl structure and adapted to be moved downwardly into closed position with its lower edge positioned next to said blade portion for closing the bowl when loaded, and a loading plate member extending transversely across said bowl structure and having a forward edge pivotally connected to said bowl structure for swinging up or down about a transverse axis and normally occupying a trailing position projecting rearwardly from its pivot axis into adjacency with said gate near the lower edge of the latter and being held against swinging upwardly except with and during opening of said gate, whereby said loading plate holds down and directs into the bowl fluidic earth materials which otherwise tend to pile up ahead of the scraper blade during loading movement of the scraper.

8. The earth loading scraper defined in claim 7, wherein the gate is inclined rearwardly and downwardly and the loading plate is free floating and disposed to bear upwardly against the lower portion of the gate to be held thereby, in varying elevated positions determined by the positions of the gate, against the upward pressure exerted on said plate by earth material piling up ahead of the blade.

9. The earth loading scraper defined in claim 8, wherein the bowl structure includes a transverse structurally connected bar-like member located forwardly from the scraper blade and serving as the pivotal support for the loading plate, said bar-like member being adapted for the mounting of scarifier teeth thereon and having coupling means adapted for engagement by a complemental coupling element of a tow rig for towing of said bowl structure for loading purposes.

10. The scraper defined in claim 8, and stop means limiting the angle of swing of the loading plate independently of gate position.

11. A tow connector for towing a power scraper having a tow coupling element situated intermediate the sides of said scraper, and a scraper blade situated rearwardly from said coupling element, said tow connector comprising a coupling element complemental to said scraper coupling element and releasably engageable therewith, said connector having a portion extending rearwardly from said coupling element, including a downwardly offset portion passing beneath the scraper blade, means for securing a tow cable to said tow connector forwardly of said connector coupling element, and means for securing a haulback cable to said tow connector rearwardly extending portion at a relative location to the rear of the scraper blade, whereby the haulback cable may remain connected to the tow connector while being maintained out of contact with the scraper blade.

12. The tow connector defined in claim 11, wherein the tow connector is formed to furrow the ground ahead of the haulback cable securing means during towing with the coupling elements interengaged.

13. The tow connector defined in claim 11, wherein the tow connector includes a horizontally disposed stabilizing means including laterally projecting generally horizontal elements holding the connector against tipping sidewise.

14. Apparatus for towing a motorized earth scraper for and during loading thereof, said scraper being of the type comprising a bowl unit having a scraper blade for scraping earth into the bowl unit by forward movement thereof, and comprising a motor unit connected to the bowl unit, said apparatus comprising a ground-engaging tow connector separate from the scraper, having forward and rearward ends, a tow cable connected to the forward end of said connector for drawing it forwardly to engage and tow the scraper, a haulback cable connected to the rearward end of said connector to haul the connector back to a point of beginning, a coupling element mounted on said connector at a location forwardly of its rearward end, a complementally formed coupling element mounted on the motor scraper, said coupling elements being complementally formed to permit releasable interengagement thereof for towing and loading the scraper, by first maneuvering the motorized scraper under its own power into the line of advance of the tow connector, and then by forward relative movement of the connector drawn by the tow cable, until said coupling element thereof abuts said complemental coupling element on the scraper, the length of the portion of said connector extending rearwardly from said coupling element exceeding the distance by which the lower edge of a scraper blade in loading position is spaced rearwardly from the scraper-mounted coupling element, thereby to prevent contact of the scraper blade with said haulback cable during loading of the scraper by towing the same with said connector and tow cable.

15. The apparatus defined in claim 14, wherein the connector coupling element comprises an upwardly projecting lug having a forward edge portion adapted to seat against the complemental coupling element on a motor scraper.

16. The apparatus defined in claim 15, wherein the tow connector comprises an elongated towing bar having a forward end portion to which the tow cable is connected, and a rearward end portion to which the haulback cable is connected offset below said forward end portion with the bar horizontal, said bar having a downwardly projecting ground-furrowing element situated intermediate its ends and adapted during towing movement with the coupling elements interengaged to entrench the haulback cable.

17. The apparatus defined in claim 16, wherein the tow connector further includes a generally flat ground-engaging flotation plate mounted generally horizontally on the forward end portion of the towing bar and projecting generally laterally from opposite sides thereof, thereby to prevent said bar from burying itself while being pulled by a tow cable.

18. Apparatus for towing a motorized earth scraper for and during loading thereof, said scraper being of the type comprising a bowl unit having a scraper blade for scraping earth into the bowl unit by forward movement thereof, and comprising a motor unit connected to the bowl unit, said apparatus comprising a ground-engaging tow connector separate from the scraper, having forward and rearward ends, a tow cable connected to the forward end of said connector for drawing it forwardly to engage and tow the scraper, a haulback cable connected to the rearward end of said connector to haul the connector back to a point of beginning, a coupling element mounted on said connector at a location forwardly of its rearward end, a complementally formed coupling element mounted on the motor scraper, said coupling elements being complementally formed to permit releasabe interengagement thereof for towing and loading the scraper, the length of the portion of said connector extending rearwardly from said coupling element exceeding the distance by which the lower edge of a scraper blade in loading position is spaced rearwardly from the scraper-mounted coupling element, thereby to prevent contact of the scraper blade with said haulback cable during loading of the scraper by towing the same with said connector and tow cable.

19. Apparatus for towing a motorized earth scraper for and during loading thereof, said scraper being of the type comprising a bowl unit having a scraper blade for scraping earth into the bowl unit by forward movement thereof, and comprising a motor unit connected to the bowl unit, said apparatus comprising a ground-engaging tow connector separate from the scraper, having forward and rearward ends, a tow cable connected to the forward end of said connector for drawing it forwardly to engage and tow the scraper, a haulback cable connected to the rearward end of said connector to haul the connector back to a point of beginning, a coupling element mounted on said connector at a location forwardly of its rearward end, a complementally formed coupling element mounted on the motor scraper, said coupling elements being complementally formed to permit releasable interengagement thereof for towing and loading the scraper, by first maneuvering the motorized scraper under its own power into the line of advance of the tow connector, and then by forward relative movement of the connector drawn by the tow cable, until said coupling element thereof abuts said complemental coupling element on the scraper.

References Cited in the file of this patent

UNITED STATES PATENTS

| Number | Name | Date |
|---|---|---|
| 534,503 | Fox | Feb. 19, 1895 |
| 544,051 | Redmond et al. | Aug. 6, 1895 |
| 1,367,127 | Culbertson | Feb. 1, 1921 |
| 2,243,831 | Berner | June 3, 1941 |
| 2,528,741 | Clark | Nov. 7, 1950 |
| 2,699,919 | Addicks | Jan. 18, 1955 |